United States Patent [19]

Gardner

[11] 4,253,265
[45] Mar. 3, 1981

[54] ANIMAL TRAP

[76] Inventor: Francis D. Gardner, 128A Argyle St., 8th Floor, Kowloon, Hong Kong

[21] Appl. No.: 36,310

[22] Filed: May 7, 1979

[51] Int. Cl.³ .................... A01M 23/24; A01M 23/26
[52] U.S. Cl. .......................................... 43/92; 43/93
[58] Field of Search .................. 43/83, 88, 92, 93, 95, 43/97

[56] References Cited

U.S. PATENT DOCUMENTS

| 334,311 | 1/1886 | Vasseur | 43/93 |
| 351,810 | 11/1886 | Skinner | 43/92 |
| 1,105,458 | 7/1914 | Rogers | 43/92 |
| 1,387,826 | 8/1921 | Arneth | 43/92 |
| 2,414,627 | 1/1947 | Arnsparger | 43/88 |
| 3,939,596 | 2/1976 | Webley | 43/93 |

Primary Examiner—Nicholas P. Godici
Assistant Examiner—K. Bradford Adolphson
Attorney, Agent, or Firm—Klarquist, Sparkman, Campbell, Leigh, Hall & Whinston

[57] ABSTRACT

An adjustable animal trap is adapted for both trigger and triggerless operation. A pivotal support for the trap's pan frame is movable along a slot located at right angles to the trap jaws for positioning a catch in engaging relation with a trap jaw. A second pivotal support is slidably positionable along the same slot and carries a trigger lever for alternatively engaging the pan frame catch. The pan is also slidable along the pan frame.

8 Claims, 6 Drawing Figures

U.S. Patent     Mar. 3, 1981     4,253,265
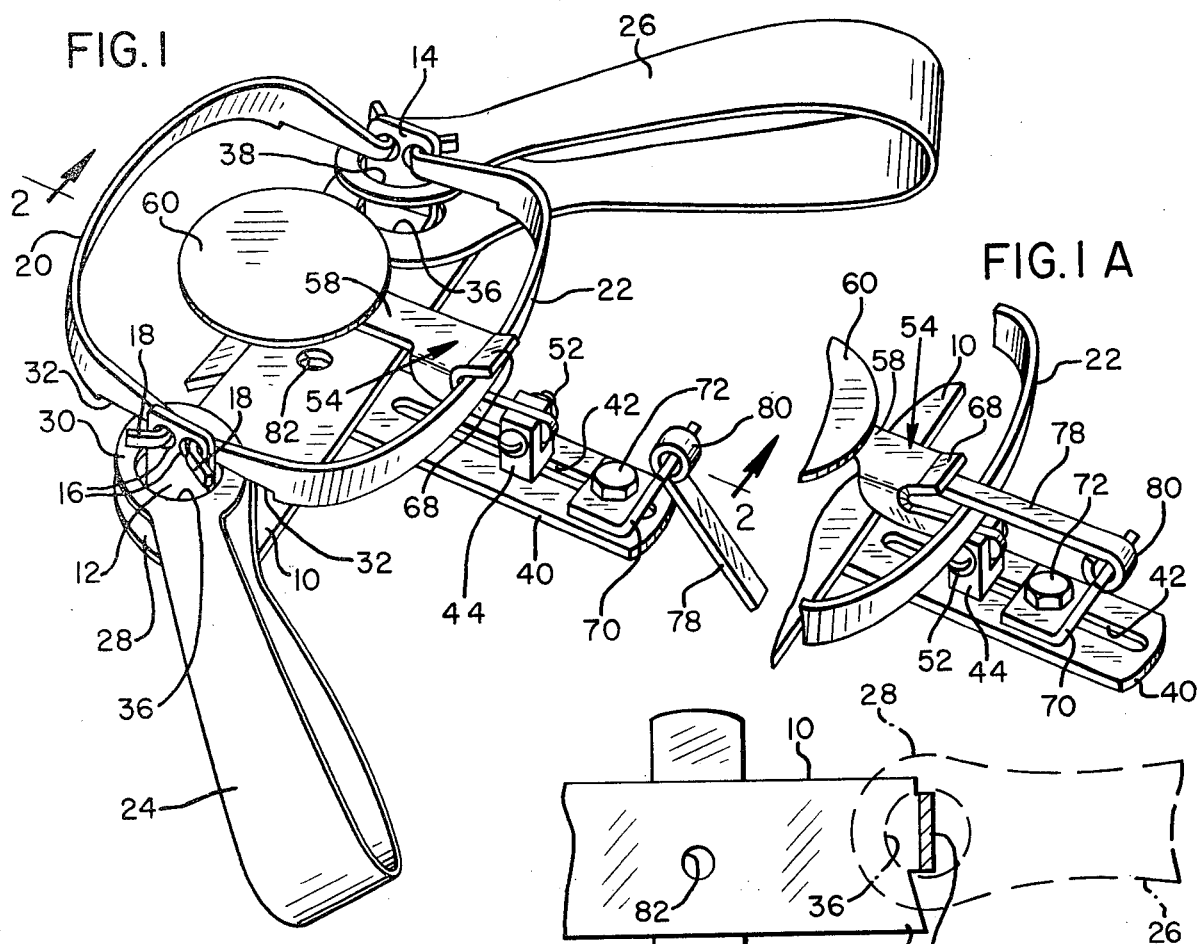
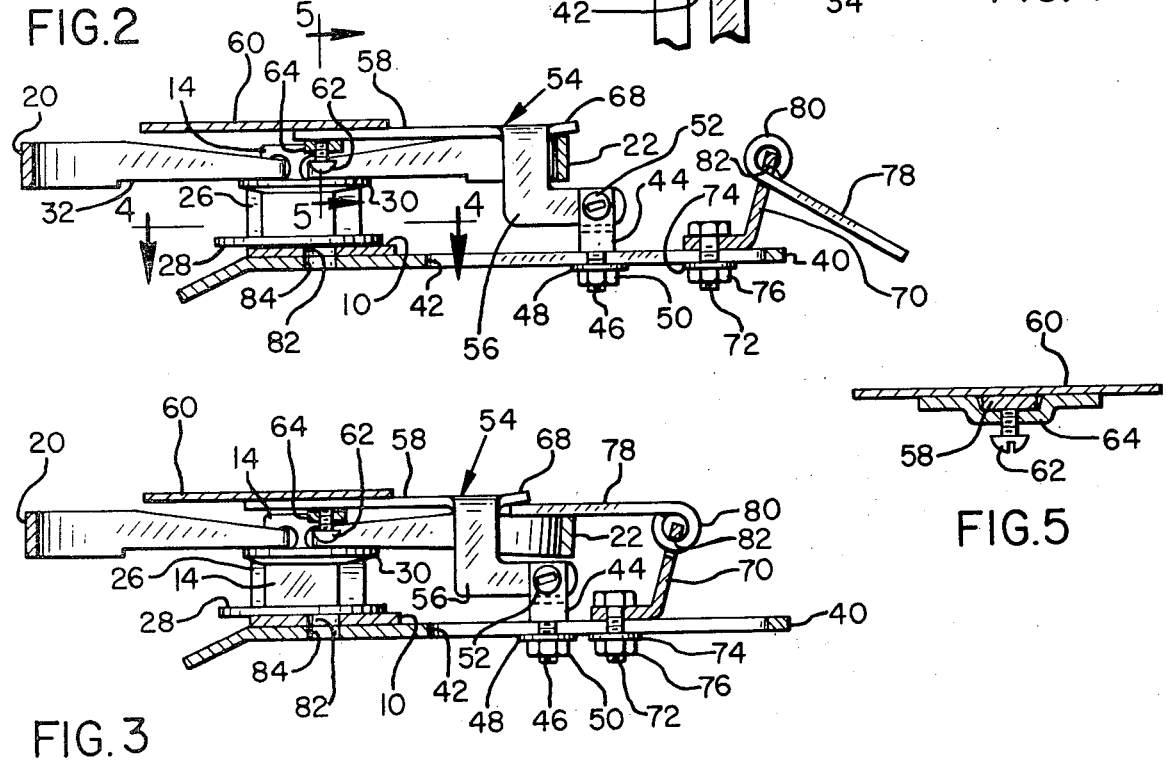

ANIMAL TRAP

BACKGROUND OF THE INVENTION

The present invention relates to animal traps and particularly to an adjustable animal trap adapted for selectable operating modes.

Conventional animal traps are provided with a pair of U-shaped jaws and a trigger lever adapted to engage one of the jaws when held in position by the pan. Pressure on the pan disengages the trigger lever and allows the trap to spring. Unfortunately, movement of the trigger lever can propel an animal away from the trap, and furthermore the conventional trap frequently has insufficient leverage for exerting the desired holding pressure on the trap jaws. A so-called triggerless trap utilizes a pan mechanism for directly engaging the trap jaw without using a trigger lever. However, traps of this kind are sometimes not too sensitive and require additional pressure on the pan for springing. Therefore, the trigger trap may at times be preferred. In any case, most traps lack the capability of easy adjustment of sensitivity to suit different circumstances.

SUMMARY OF THE INVENTION

According to the present invention in a preferred embodiment thereof, an animal trap includes a base and a side member along which a pivotal support for the trap's pan frame and a pivotal support for the trigger lever are slidably adjustable. The pivotal supports are positionable for adjusting the sensitivity of the trap and for locating either the pan frame or the trigger lever in engagement with the trap jaw. Optimum sensitivity and pan position for a given circumstance can be achieved.

According to a particular embodiment of the present invention, the pan is slidably positionable along the pan frame for locating the pan and accommodating slidable movement of the pan frame.

It is an object of the present invention to provide an improved and adjustable animal trap for securing optimum sensitivity.

It is another object of the present invention to provide an improved animal trap which is convertible between trigger and triggerless operation.

It is a further object of the present invention to provide an improved animal trap having improved spring operation and stability features.

The subject matter which I regard as my invention is particularly pointed out and distinctly claimed in the concluding portion of this specification. The invention, however, both as to organization and method of operation, together with further advantages and objects thereof, may best be understood by reference to the following description taken in connection with the accompanying drawings wherein like reference characters refer to like elements.

DRAWINGS

FIG. 1 is a perspective view of an animal trap according to the present invention;

FIG. 1A is a partial view of the right-hand portion of the FIG. 1 trap, illustrating an alternative mode of operation;

FIG. 2 is a cross-sectional view taken at 2—2 in FIG. 1;

FIG. 3 is a similar cross-sectional view illustrating the alternative mode of operation.

FIG. 4 is a cross-sectional view, partially broken away and partially in phantom, taken at 4—4 in FIG. 2; and FIG. 5 is a partially broken away cross-sectional view taken at 5—5 in FIG. 2.

DETAILED DESCRIPTION

Referring to the drawings, the trap according to the present invention includes an elongated flat metal base 10 having upstanding ends 12 and 14, each provided with apertures 16 for receiving opposite hooked terminal ends 18 of U-shaped jaws 20 and 22. The jaws are rotatable about axes defined between aligned apertures 16 on opposite base ends so the jaws 20 and 22 may rotate from a flat open position shown in FIGS. 1, 1A, 2 and 3 to an upstanding, closed, substantially adjacent position.

Substantially U-shaped flat metal springs 24 and 26 are each provided with a flat lower enlarged end 28 apertured at 36 and an upper enlarged end 30 apertured at 38 adapted to receive one of the base ends 12 or 14. Upper enlarged ends 30 of the springs engage cam edges 32 of jaws 20 and 22, with the springs being under appreciable tension for urging the jaws upwardly toward their closed or upstanding position. Upper enlarged spring ends 30 are upwardly concave in shape whereby the outer, upwardly turned edges of each end 30 engage the cam edges 32 of the jaws 20 and 22 for enhancing the leverage of the springs while supporting both jaws in the position shown without allowing one jaw to drop. The lower end 28 of each spring is larger than corresponding upper end 30. As illustrated in FIG. 4, lower end 28 has a width comparable to the width of base 10 which itself is wider than is customary for prior art traps whereby to stabilize and align the spring and provide optimum upward force. The forward edge of the base 10 is preferably flared outwardly at each outside corner 34, especially in smaller size traps, for providing additional flat support for spring ends 28.

The base 10 is provided with a metal side member 40 weldably secured thereto and extending outwardly therefrom. An elongated slot 42, formed in said side member, extends away from the base 10 in substantially perpendicular relation to the turning axes of jaws 20 and 22. A first pivotal support 44 is positionable along said side member, having a threaded extension 46 received through the slot 42 and engaged by a washer 48 and a nut 50 at the underside of the side member whereby to secure the first pivotal support 44 at a given position along the slot. The upper part of pivotal support 44 is clevis-shaped and receives a bolt 52 about which pan frame 54 pivots, and specifically the lower L-shaped arm 56 of the pan frame. The L-shaped arm 56 extends downwardly from upper flat portion 58 of the pan frame and outwardly toward the outer end of side member 40. The pan frame is thus adjustably positionable along the side member 40.

Flat upper portion 58 of the pan frame carries a round flat pan 60 which is preferably located centrally between the jaws of the trap. A metal screw 62 threadably engages a strap 64 secured at either end to the bottom of pan 60, and bears against the underside of flat portion 58 of the pan frame which passes over the strap. The pan is thereby adjustably positionable along the pan frame in a direction substantially parallel to said side member.

The outer end of upper portion 58 of the pan frame, i.e. the end toward pivotal support 44, extends outwardly of L-shaped portion 56 and forms a catch 68 illustrated in overlying engaging relation to jaw 22 in FIGS. 1 and 2. It will be appreciated the pivotal support 44 may be adjustably located along slot 42 whereby to provide the proper engagement between catch 68 and jaw 22. For the engaged position, as illustrated, jaw 22 can be held down against the pressure exerted by springs 24 and 26, and therefore jaw 20 will also reside in its lower or horizontal position. Pressure on pan 60 will cause rotation of the pan frame in a counterclockwise direction as illustrated in the drawings, releasing the catch and allowing both jaws to rotate upwardly under spring pressure. This mode of operation is the so-called triggerless mode whereby catch 68 on pan frame 54 engages the jaw 22 for holding the same in its open position. Moving the pan frame back and forth along slot 42 results in adjusting the up and down position of the pan to suit the trapper and also adjusts the sensitivity of the trap.

The trap is further provided with a second pivotal support 70 in the form of an L-shaped metal member, the legs of which make an angle of over ninety degrees with one another. The lower leg thereof is positioned against the upper side of side member 40 and is provided with an aperture receiving a bolt 72 which also extends through slot 42 between the support 44 and the outer end of the slot. The lower threaded end of bolt 72 receives a washer 74 and a nut 76 which can be drawn up tightly against the lower side of member 40 thereby securely positioning support 70 at a predetermined location along the side member. Support 70 is readily changed in position along side member 40. Thus bolt 72 is loosened the pivotal support 70 is moved to the desired position along slot 42, and bolt 72 is then retightened. Trigger lever 78, comprising a flat metal bar, has one end thereof formed into a loop 80 pivotally engaging an aperture 82 in the upper end of the upstanding leg of support 70 where such leg extends upwardly and outwardly toward the outer end of side member 40.

In employing the trigger mode of operation, the first pivotal support 44 is moved toward base 10 from the location illustrated in FIGS. 1 and 2. The second pivotal support 70 is then moved inwardly toward base 10 whereby trigger lever 78 can be employed in setting the trap in the manner illustrated in FIGS. 1A and 3. That is, the trigger lever 78 is extended across jaw 22, while pan frame 54 is positioned with catch 68 in engaging relation over the forward tip of trigger lever 78. Pressure on pan 60 will rotate pan frame 54 in a counterclockwise direction as viewed in FIG. 3, releasing trigger lever 78 and allowing spring pressure to force jaws 20 and 22 upwardly to their upstanding, juxtaposed position. Both the position of the pan frame 54 and the position of the trigger lever 78 can be adjusted along slot 42 for adjusting the sensitivity of the trap and the up and down position of the pan 60.

The mode of operation as illustrated in FIGS. 1A and 3 generally has the advantage of enhanced sensitivity, through adjustment of the point at which jaw 22 engages the underside of trigger lever 78, and the point at which catch 68 engages the upper side of trigger lever 78. Thus, a longer lever arm, as measured from loop 80, is provided at the location of catch 68 so that less pan pressure is required to overcome friction between catch 68 and trigger lever 78 to spring the trap. In any case, the adjustable pivotal supports allow the adjustment to a "hair trigger" condition for either the mode of operation of FIGS. 1 and 2 or the mode of operation of FIGS. 1A and 3.

It will be observed that pan 60 is located differently with respect to pan frame 54 in the FIG. 3 configuration as compared to the FIG. 2 configuration. In each case, the pan 60 is desirably located approximately centrally between the jaws, but since the pan frame has been adjusted to the left in FIG. 3 as compared with FIG. 2, pan 60 has been adjusted, relatively to the right, along the pan frame so as to retain its central location. Thus, screw 62 is loosened, the pan 60 is moved relatively to the right, and screw 62 is retightened at the latter position. As a matter of convenience, base 10 and side member 40 are respectively provided with matching apertures 82 and 84 which are aligned with the slotted head of screw 62 in the correct position. In changing from the configuration of FIGS. 1 and 2 to the configuration of FIGS. 1A and 3, screw 62 is first loosened, and then first pivotal support 44 is loosened, moved to the left, and tightened at the desired FIG. 3 position. Then, pan 60 is moved to the right and screw 62 is retightened. A screw driver is readily extendable through apertures 82 and 84. Then, second pivotal support 70 is moved to the left into position for engaging catch 68, as illustrated in FIGS. 1A and 3. As will be appreciated, the second pivotal support 70 can be left out of the way when not in use, as shown in FIGS. 1 and 2, or may be demounted entirely if so desired.

While I have shown and described plural embodiments of my invention, it will be apparent to those skilled in the art that many other changes and modifications may be made without departing from my invention in its broader aspects. I therefore intend the appended claims to cover all such changes and modifications as fall within the true spirit and scope of my invention.

I claim:
1. An animal trap comprising:
    a base and a pair of opposing U-shaped jaws having opposite terminal ends pivotally supported by said base for rotation with respect to spaced parallel axes, said base having a side member extending outwardly therefrom,
    spring means for urging said jaws from a first open position in substantially parallel relation to said base to a second closed position wherein said jaws are in upstanding, substantially adjacent juxtaposition,
    a pan and a pan frame for carrying said pan, said frame having a catch adapted to engage one of said jaws in the open jaw position,
    a pivotal support for said pan frame, said pivotal support being slidably positionable along said side member for selectively locating said catch in position for holding said one of said jaws in open position such that pivoting of said pan frame relative to said support in response to pan pressure is able to disengage the catch and spring the trap,
    a trigger lever support for mounting on said side member,
    and a trigger lever pivotally carried by said trigger lever support, said trigger lever being alternatively positionable across a said jaw for engagement with said catch on said pan frame to hold said jaw in open position,
    said pivotal support being slidable along said side member away from said one of said jaws to bring said catch out of engaging relation with said one of said jaws to a second position for engagement with said trigger lever.

2. The trap according to claim 1 wherein said trigger lever support includes means for slidably positioning the trigger lever support along said side member.

3. The trap according to claim 2 wherein said side member is provided with a slot in substantially perpendicular relation to said jaw axes for receiving said pivotal support for said pan frame and said trigger lever support.

4. The trap according to claim 3 wherein said pivotal support for said pan frame and said trigger lever support are provided with threaded fasteners engageable therewith for passing through said slot to permit adjustment of said pivotal support for said pan frame and said trigger lever support along said slot.

5. The trap according to claim 1 including means for slidably adjusting said pan relative to said pan frame in a direction substantially parallel to said side member.

6. The trap according to claim 1 wherein said spring means comprise a pair of substantially flat springs under tension in a substantially U-shaped configuration, each spring including an apertured upper enlarged end and an apertured lower enlarged end for receiving portions of said base while the upper enlarged ends bear against said jaws for urging the same toward closure, said lower enlarged ends being flat and larger in diameter than said upper enlarged ends, said base having a width comparable with the diameter of said lower enlarged ends for supporting the same.

7. The trap according to claim 6 wherein the upper enlarged ends of said springs are concave upwardly toward said jaws.

8. The trap according to claim 6 wherein said base is flared outwardly at each end thereof under said spring enlarged ends for providing support therefor.

* * * * *